US008228510B2

(12) United States Patent
Pangrazio et al.

(10) Patent No.: US 8,228,510 B2
(45) Date of Patent: Jul. 24, 2012

(54) DIMENSIONAL DETECTION SYSTEM CALIBRATION METHOD

(75) Inventors: John Gregory Pangrazio, Volo, IL (US); John Alan Pangrazio, Island Lake, IL (US); Robert Thomas Pangrazio, Jonesboro, AR (US); Kenneth Lloyd Brey, Mount Prospect, IL (US); Cesar Pena-Gutierrez, Chicago, IL (US)

(73) Assignee: LTS Scale Company, Twinsburg, OH (US)

( * ) Notice: Subject to any disclaimer, the term of this patent is extended or adjusted under 35 U.S.C. 154(b) by 0 days.

(21) Appl. No.: 13/324,149

(22) Filed: Dec. 13, 2011

(65) Prior Publication Data

US 2012/0081714 A1    Apr. 5, 2012

Related U.S. Application Data

(63) Continuation of application No. 12/784,622, filed on May 21, 2010, now Pat. No. 8,134,717.

(51) Int. Cl.
*G01B 11/14*    (2006.01)
*G01B 11/00*    (2006.01)
*G06K 9/00*    (2006.01)

(52) U.S. Cl. ..................... 356/614; 356/625; 356/243.1; 382/154

(58) Field of Classification Search .......... 356/600–625, 356/243.1–243.8; 382/153, 154, 141, 165; 348/47, 42, 94, 135; 358/1.9, 504, 505, 514, 358/518
See application file for complete search history.

(56) References Cited

U.S. PATENT DOCUMENTS

| | | | |
|---|---|---|---|
| 5,175,981 A | | 1/1993 | Gombos et al. |
| 5,619,587 A | * | 4/1997 | Willoughby et al. .......... 382/141 |
| 5,661,667 A | * | 8/1997 | Rueb et al. ........................ 702/95 |
| 6,064,629 A | * | 5/2000 | Stringer et al. ................ 367/128 |
| 6,140,650 A | * | 10/2000 | Berlad ....................... 250/363.09 |
| 2002/0122174 A1 | | 9/2002 | Hamamatsu et al. |
| 2003/0071194 A1 | * | 4/2003 | Mueller et al. .............. 250/208.1 |
| 2004/0085443 A1 | * | 5/2004 | Kallioniemi et al. .......... 348/135 |
| 2004/0105099 A1 | | 6/2004 | Nikoonahad |
| 2008/0055591 A1 | | 3/2008 | Walton |
| 2010/0110204 A1 | * | 5/2010 | Campbell et al. ........... 348/208.7 |

* cited by examiner

*Primary Examiner* — Sang Nguyen
(74) *Attorney, Agent, or Firm* — Eckert Seamans Cherin & Mellott, LLC; Brij K. Agarwal (57) ABSTRACT

An improved dimensional detection system is portable and can be used to characterize a workpiece. The dimensional detection system employs as few as a single focused light source and as few as a single camera along with a calibration data set to convert the illuminated pixels of an image of a beam on the workpiece into a cloud of real world points in space on an outer surface of the workpiece. The cloud of points can be processed to characterize the workpiece, such as by determining the right hexahedron that would encompass all of the real world points in space and which could be used to determine a dimensional weight of the workpiece.

3 Claims, 9 Drawing Sheets

DIMENSIONAL DETECTION SYSTEM CALIBRATION METHOD

CROSS REFERENCE TO RELATED APPLICATION

This application is a Continuation of Ser. No. 12/784,622 filed on, now U.S. Pat. No. 8,134,717 May 21, 2010, the contents of which are incorporate herein by reference.

BACKGROUND OF THE INVENTION

1. Field of the Invention

The disclosed and claimed concept relates generally to a dimensional detection system and, more particularly, to a system that employs as few as a single camera and as few as a single laser in performing a dimensional analysis on a workpiece.

2. Background Information

Shipping costs are typically determined based on various measurements of an object being shipped (hereinafter, the "workpiece"). Weight, as is well known, is based upon the mass of a workpiece and can be determined with the use of a scale. Shipping costs can also be affected by the physical dimensions of a workpiece. The expression "dimensional weight" thus relates to a characterization of a workpiece in a fashion that can encompass aspects of both the weight and the physical dimensions of the workpiece or at least an aspect of the more significant of the two. The dimensional weight of a workpiece can be based upon a load as disposed on a pallet. Such a pallet may, and often does, support more than one object. Thus, even if several generally rectangular objects are stacked on a pallet, the resulting workpiece may have a non-rectangular shape.

It is understood that a dimensional weight is a characterization of a workpiece. That is, the workpiece may have an unusual shape or may include several rectangular boxes which are stacked so as to be an unusual shape. While it may be possible to determine the exact volume of such a workpiece, a dimensional weight calculation potentially may "square out" the size of the workpiece. That is, as the workpiece, typically, cannot be made smaller than the greatest length in, or parallel to, any given plane defined by two of three axes, the dimensional weight calculation may take into account the volume of the workpiece as determined by the maximum length along, or parallel to, one or more of the X-axis, the Y-axis, and the Z-axis.

This volume is then divided by a standard unit (166 in.$^3$/lb. (international) or 192 in.$^3$/lb. (domestic)) to achieve a dimensional weight. For example, if a workpiece is measured to be six feet (72 inches) by four feet (48 inches) by three feet (36 inches), the dimensional weight would be calculated as follows: First the volume is calculated as: 72 in.*48 in.*36 in.=124,416 in.$^3$ The volume is then divided by the standard unit, in this example the domestic standard unit: 124,416 in.$^3$.÷192 in.$^3$/lb=648 lbs. Thus, the dimensional weight is 648 pounds. The shipping cost would then be determined by using the greater of the dimensional weight or the actual physical weight, as measured by a scale. So, if the workpiece was an iron ingot weighing 2,000 pounds, the actual weight would be used to determine the shipping cost. Alternatively, if the workpiece was a carton of feather pillows weighing 200 pounds, the dimensional weight would be used to determine the shipping cost.

The determination of a dimensional weight is typically performed at a stationary device/station into which a workpiece must be placed. The dimensional weight has typically been determined by a system using time-of-flight data, i.e. providing a wave (either sound or electromagnetic) and measuring the time it takes for the wave to reflect from the workpiece. Such time-of-flight devices typically use a plurality of transducers that must be maintained and kept properly oriented. Such time-of-flight transducers may be expensive. Other systems utilize a plurality of light projection devices, typically lasers, and multiple cameras to create, or emulate, a three-dimensional perspective. Such systems may be disposed in a tunnel or similar construct through which a forklift truck passes while carrying the workpiece. Similar, but smaller systems may be disposed about a conveyor belt that transports workpieces.

At a shipping facility, the dimensional weight of a workpiece may be determined as the workpiece is disposed upon a pallet. A forklift truck or similar device may move the pallet into/onto/through a device structured to determine the dimensional weight. If the device is a station, the pallet is typically driven to the location of the station, after which the dimensional weight is determined, and the pallet and workpiece are moved on for further processing. If the system utilizes a tunnel, the forklift truck drives the workpiece to the location of the tunnel and then drives at a relatively slow pace through the tunnel to ensure the multiple cameras/lasers acquire the necessary data.

Thus, a number of shortcomings are associated with known systems for assessing the dimensions or dimensional weight or both of a workpiece. First, known dimensional weight systems can be expensive to build and maintain. Second, the processing of a workpiece at a shipping facility may be slowed by the required steps of transporting the workpiece to, and positioning the workpiece in, or slowly through, the dimensional weight device.

SUMMARY OF THE INVENTION

The disclosed and claimed concept relates to a system and method for characterizing a workpiece, which may include calculating a dimensional weight. The system may be coupled to a forklift truck and utilized while the workpiece is being transported, thus making such a system portable. The system can also be situated in a stationary position, such as at a customer window of a shipping facility, inside the mouth of a trailer of a semi tractor-trailer, or potentially at a location along or at an end of a conveyer apparatus, so long as the system can have a clear view of the workpiece. Further, the system may be structured to characterize the workpiece using an image of a beam that is projected on the workpiece and further employing mathematical analysis on the pixels of the image with the use of a calibration data set. The system can generally be said to be free of any time-of-flight devices. Instead, the system and an improved method rely upon converting data from a two-dimensional image into a set of points in space that may be representative of a three-dimensional object. The system may further employ one or more algorithms to characterize the workpiece based upon the set of points in space.

The dimensional detection system includes as few as a single focused light source, as few as a single camera, and an image analysis device. As used herein, "single" means no more than one. The focused light source is structured to project a beam of light as a substantially straight line, although the beam could be of other shapes without departing from the present concept.

The portable system for characterizing a workpiece is initially calibrated using a flat calibration platform. An upper surface of the calibration platform includes a series of reference images that are disposed at known locations on the calibration platform. The focused light source projects at least one beam, and typically many individual beams in series, across the calibration platform when the calibration platform is at a number of known heights. As employed herein, the expression "a number of" and variations thereof shall refer broadly to any nonzero quantity, including a quantity of one. The focused light source projects a beam at a certain angle relative to a fixed reference axis which, in the exemplary embodiment herein, is a structure upon which the focused light source rests. The projection of the beam at a certain angle relative to the fixed reference axis and at a certain height of the calibration platform causes the beam to impinge on and appear at a specific location on the calibration platform. The projection of the beam is repeated at the same certain angle for each of a plurality of known heights of the calibration platform.

The focused light source is actually projected at the calibration platform at each of a plurality of known angles relative to the fixed reference axis and at each of a plurality of known heights of the calibration platform. Each time a line is projected at an angle it may be referred to herein as a "sweep". There may be many sweeps at known angles performed at each of a plurality of known heights of the calibration platform.

An image, preferably a digital image, records the location of the beam on the calibration platform for each sweep. The image comprises a plurality of pixels arranged as a two-dimensional grid. The reflection of the beam on the calibration platform is represented by pixels that may be illuminated to varying degrees or that may have different/identifiable colors or both. For example, a laser may project a bright red light, thus, the reflected beam is bright and is also red. In a two-dimensional image, such a reflected line may be captured as a series of pixels that are illuminated or that are red or are both.

The discussion herein shall refer to both two-dimensional coordinates, such as on an image of a beam on an object, and a correspondence of those coordinates with three-dimensional coordinates in space of points on a surface of the object. During the calibration procedure, the "object" is the calibration platform. After completion of the calibration procedure and during operation of the measurement apparatus, the "object" may be a workpiece such as may be disposed on a pallet of a forklift truck.

Figure 1:
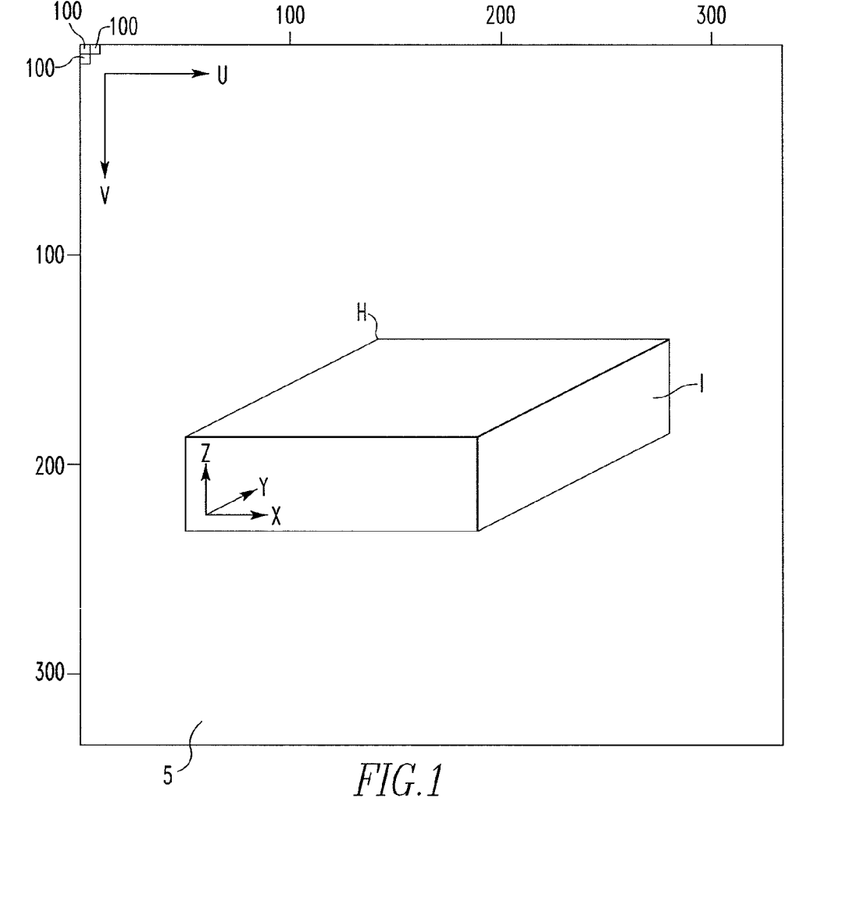
FIG. 1 is a reference figure demonstrating the coordinate systems that are discussed herein.

An example of the latter is shown generally in FIG. 1, which can be said to be a "picture" of a workpiece 1, and which will be helpful to illustrate the two different types of coordinate systems employed herein. The workpiece 1 may be defined in Cartesian coordinates traditionally represented by three axes in three-dimensional space labeled X, Y, and Z, as shown. The "picture" is shown with a border for the sake of reference but is typically an image 5 that may, and typically does, exist only as a digital image. The two-dimensional image 5 has only two axes, labeled U, V. As shown, the image 5 axes U, V may have an origin that is disposed in the upper left-hand corner. In this location, the image 5 axes have positive numbers increasing from left to right (U axis) and from top to bottom (V axis). Further, and as discussed below, the units for the image 5 axes are preferably pixels. The workpiece 1 is typically measured in traditional units, e.g. inches or (centi)meters. By way of example, the three-dimensional workpiece 1 (in this figure only) measures twelve by eight by four inches as measured along X, Y, and Z axes of the workpiece 1 whereas the pixel at the highest point "H," in the image 5 is at image pixel coordinates (U, V) 120, 140.

For the various images at any given angle of the beam on the calibration platform at various heights, some of the illuminated pixels (having U, V coordinates within the image) are converted into a corresponding plurality of real world points in space having X, Y, Z coordinates, with each such real world point being a point on a surface of the calibration platform at one of its known heights. Such U, V coordinates of illuminated pixels at a given angle of the beam at all heights of the calibration platform and the corresponding real world X, Y, Z points in space are then subjected to a Newtonian Approximation procedure employing a pair of equations which may take the exemplary form:

$$U=aX+bY+cZ+d$$

$$V=eX+fY+gZ+h$$

in order to solve for the six coefficients a, b, c, e, f, and g (generally, the coefficients "d" and "h" are zero, or very small, and may be ignored.) That is, the U, V coordinates of an illuminated pixel in an image and the X, Y, Z real world coordinates of a corresponding point in space are fed into those two equations with random values for a, b, c, e, f, and g. The process is repeated for a plurality of such sets of illuminated pixel coordinates at the given angle of the beam and corresponding coordinates of real world points in space until the six coefficients a, b, c, e, f, and g are determined with the aforementioned Newtonian Approximation or other methodology.

A different set of six coefficients a, b, c, e, f, and g is determined for each angle of the beam (which may be referred to as a calibration beam from the light source) using this methodology. That is, once the six coefficients a, b, c, e, f, and g are determined for a given angle of the calibration beam, the process is repeated for each of a number of other known angles of the calibration beam to generate a separate set of the six coefficients a, b, c, e, f, and g for each such angle. The calibration data set for the measurement apparatus can thus be said to comprise a plurality of sets of the six coefficients a, b, c, e, f, and g, with each set being associated with an angle of the beam.

The calibration data set can thereafter be employed when a workpiece is placed onto a pallet and the beam (which may now be referred to as an analysis beam from the light source) is directed at a plurality of the same angles onto the workpiece and images are collected at each such beam angle. More particularly, the U, V coordinates of illuminated pixels of an image taken at a predetermined angle of the analysis beam on the workpiece are plugged into the two aforementioned equations along with the six coefficients a, b, c, e, f, and g from the calibration data set for that predetermined angle of the beam to arrive at corresponding real world X, Y, Z coordinates of corresponding points in space. Such points in space are actual points in space on the surface of the workpiece that are illuminated by the analysis beam at the predetermined angle. The process may be repeated for each of a plurality of angles of the analysis beam and associated sets of coefficients a, b, c, e, f, and g from the calibration data set.

The various points in space that have been determined from all of the angles of the analysis beam can then be the subject of further processing to characterized the workpiece. One way of characterizing the workpiece involves determining the dimensions and thus volume of a right hexahedron that would completely enclose all of the real world points in space, such as might be envisioned as corresponding with a rectangular carton that could be used to enclose the workpiece therein if such a thing were desired. As employed herein, the expression "right hexahedron" shall refer to a shape having six sides that are each oriented parallel with planes that are mutually perpendicular.

BRIEF DESCRIPTION OF THE DRAWINGS

A full understanding of the invention can be gained from the following description of the preferred embodiments when read in conjunction with the accompanying drawings in which:

FIG. 4B also depicts in broken lines the position of the calibration platform in its former position in FIG. 4A as well as the former reflection of the beam thereon.

DESCRIPTION OF THE PREFERRED EMBODIMENTS

As used herein, directional phrases, such as, but not limited to, "longitude," "lateral," "vertical," "front" and "back" and variations thereof relate to a forklift truck and the directions as observed by an operator of the forklift truck who is facing a fork assembly. It is noted that for a workpiece, the "length" extends generally front to back, the "width" extends generally side to side, and the "height" extends generally vertically.

As used herein, a "workpiece" may be a single element or a collection of elements, typically packages, which may be disposed on a pallet, and may include other objects that can be transported without a pallet. The phrase "collective workpiece" may also be used to describe a collection of workpieces disposed on a pallet.

As used herein, the "relative position" means a location identified using "U" and "V" Cartesian coordinates on a two-dimensional image.

As used herein, "pseudo-Cartesian" coordinates are the real world "X", "Y" and "Z" mappings of the "U" and "V" points in the image. It is preferred that "X" measures distance perpendicular to the longitudinal axis of the forklift truck, "Y" measures the distance along the longitudinal axis of the forklift truck and "Z" measures height from the ground or a pallet upon which the workpiece rests. These "X, Y, Z" axes are mutually perpendicular.

As used herein, a "time-of-flight device" means any device structured to determine a distance based on the time required to detect a wave reflected from a workpiece. The wave may be audio or electromagnetic and includes, but is not limited to, sonic, ultrasonic, infrared, radio (a.k.a. radar), and laser (a.k.a. lidar) waves.

As used herein, a step of "capturing an image" includes recording digital data that may be used to create an image, even if such an image is never produced in a form visible to humans. For example, a picture that is taken on a digital camera and never viewed, even temporarily, prior to deletion, is a "captured image" even though it only existed in a digital form in a storage medium such as a memory.

Figure 2:
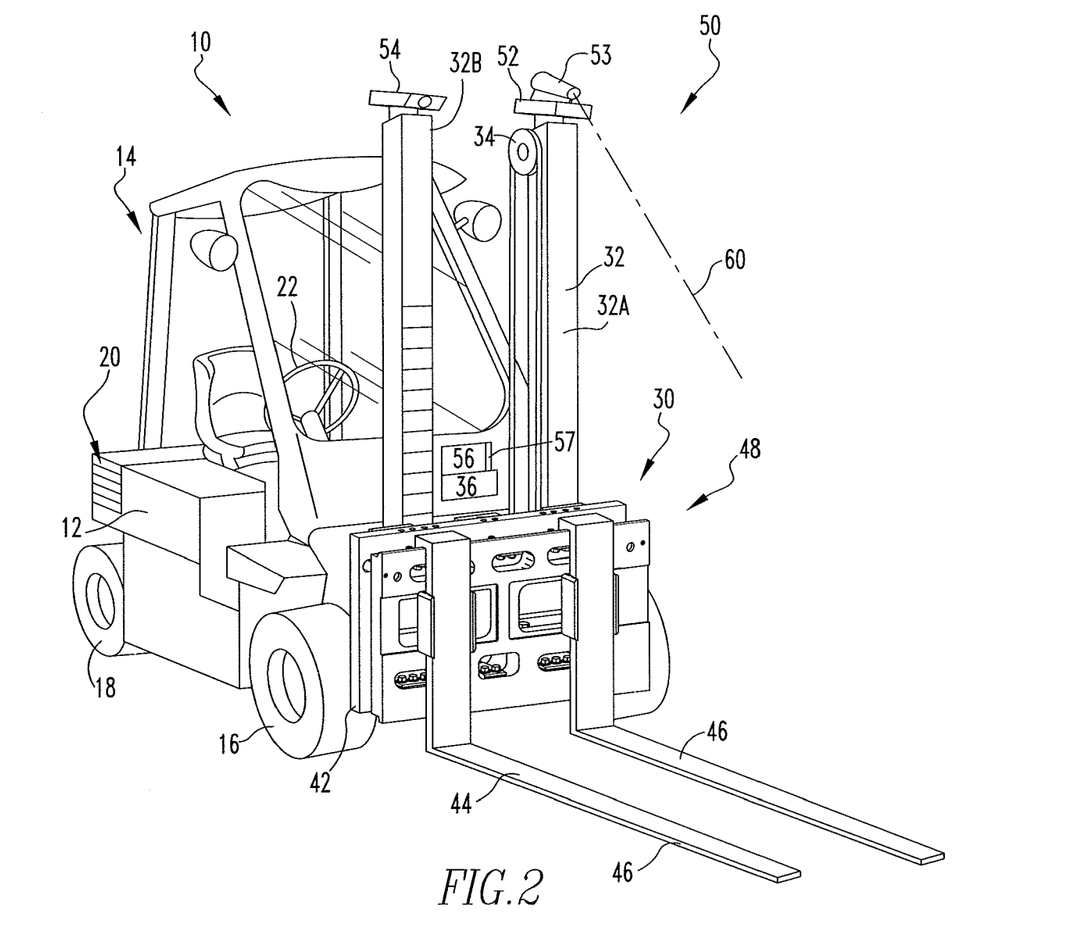
FIG. 2 is a perspective view of a forklift truck having a dimensional detection system in accordance with the disclosed and claimed concept.
Figure 3:
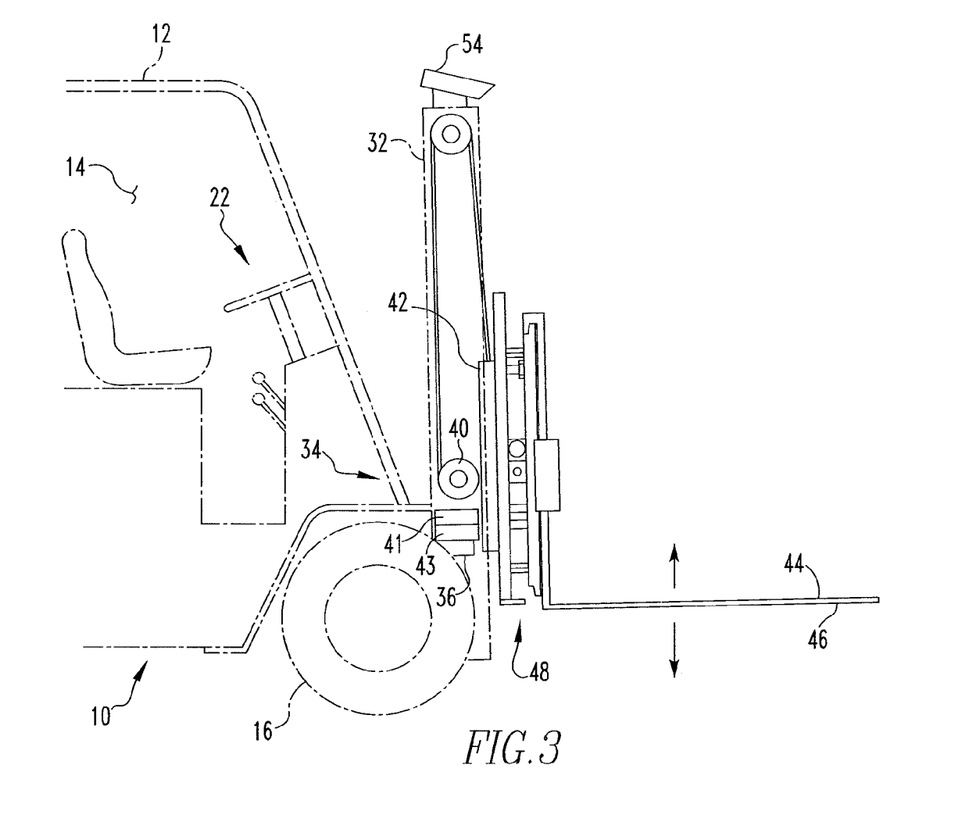
FIG. 3 is a side view of the forklift truck and dimensional detection system of FIG. 2.

As shown in FIGS. 2 and 3, a forklift truck 10 includes a vehicle body 12 and a forklift assembly 30. The vehicle body 12 has an open cabin 14, an engine and drive train (not shown), and two pairs of wheels, i.e., a front pair of wheels 16 and a back pair of wheels 18, although the pair of back wheels 18 can be in the form of a single rear wheel in some applications. It is also noted that the forklift truck 10 may be of a walk-behind configuration that does not include an enclosed cabin, or it may be of still other configurations. The back of the body 12 may have additional weight added thereto, often in the form of removable metal plates 20. The front pair of wheels 16 is preferably disposed close to the front, or beyond the front, of the vehicle body 12. Within the cabin 14 are controls 22, such as the steering wheel and drive/pneumatic/hydraulic controls structured to operate the forklift truck 10 and the forklift assembly 30.

The forklift assembly 30 is disposed at the front of the vehicle body 12 and includes at least one mast 32 and, as shown, typically two masts 32A, 32B, i.e. a first mast and a second mast 32A, 32B, and a lifting assembly 34. Each mast has an upper end 31 and a lower end 35. The masts 32 are elongated members that extend generally vertically, but may be pivotable so that the tops of the masts 32 are movable forward and rearward. That is, the masts 32 may be tilted backwards or forwards. If there is a single mast 32, the mast 32 may be disposed along the longitudinal centerline of the vehicle. If there are two or more masts 32, the masts 32 are disposed generally symmetrically about the longitudinal centerline of the vehicle body 12. The masts 32 are typically fixed to the vehicle body 12 and typically cannot be moved laterally.

As shown in FIG. 3, the lifting assembly 34 has a drive assembly 40, a load lifting carriage 42, and a lifting device 44. The load lifting carriage 42 is movably coupled to the masts 32 and is structured to be moved by the drive assembly 40 between a lower level and an upper level. Thus, the lifting assembly 34 is structured to move a load, typically a pallet 2, between a lower level and an upper level to enable movement of the load from place to place. The forklift assembly 30 may also include a scale 48.

The lifting assembly 34 may include a vertical positioning assembly 36 (shown schematically) structured to control the elevation of the load lifting carriage 42 relative to the masts 32. As shown in FIG. 3, the vertical positioning assembly 36 includes a computer or other programmable logic circuit device 41 (shown schematically) and a vertical position tracking device 43 (shown schematically). The optional vertical position tracking device 43 is coupled to the load lifting carriage 42 and is structured to substantially accurately track the elevation of the load lifting carriage 42 relative to the masts 32. The vertical position tracking device 43 provides data to the vertical positioning assembly computer 41. In this configuration, the vertical position of the load lifting carriage 42 may be substantially tracked.

Preferably, the lifting device 44 includes at least two independent tines 46 and more preferably two independent tines 46. The tines 46 are structured to lift, among other things, pallets 2. As discussed herein, it is assumed that the workpiece 1 is, typically, disposed on a pallet 2. It is noted that a workpiece 1 may be larger or smaller than the pallet 2, or the workpiece 1 may extend to the edge of the pallet 2. Moreover, the workpiece 1 may include its own lifting points that receive the tines 46 of the lifting device 44, whereby the workpiece 1 can be said to be disposed directly on the forklift truck 10 without the use of a separate pallet 2. As discussed below, beams of light are projected onto the workpiece 1 and the pallet 2 when the workpiece 1 is being analyzed. In an instance where the pallet 2 is covered by the workpiece 1, it is understood that an upper surface of the pallet 2 may be substituted for the bottom edge of the workpiece 1 if necessary.

It is noted that the masts 32 are convenient locations on the forklift truck 10 where certain components of the dimensional detection system 50 may be mounted. The dimensional detection system 50 components may, however, be coupled to any support structure that has a substantially clear view of the workpiece 1 while the workpiece 1 is disposed on the forklift assembly 30. As such, as used herein, a "mast" can be said to broadly include any support structure of the forklift truck 10 that has a substantially clear view of the workpiece 1.

The dimensional detection system 50 includes a single focused light source 52, a single image collection device 54 which in the exemplary embodiment herein is a camera 54, and an image analysis device 56 (shown schematically). Other types of image collection devices 54 such as scanners and the like can be employed without departing from the present concept. Each component of the dimensional detection system 50 is, in the depicted exemplary embodiment, coupled to the forklift truck 10. Thus, the dimensional detection system 50 is portable. Alternatively, the image analysis device 56 may be substantially independent of the forklift truck 10 but be in wireless communication with the components of the dimensional detection system 50 that are disposed on the forklift truck 10. In either embodiment, a characterization of the workpiece 1 that may include a set of dimensions of the workpiece, a volume, or a dimensional weight may be advantageously determined without having to stop the forklift truck 10 at a dimensional weighing station or other fixed location or move it past such a location. It is reiterated, however, that the dimensional detection system 50 can be installed in a stationary configuration without departing from the present concept.

The focused light source 52 is structured to project a beam of light that, if projected onto a substantially flat surface, reflects as a substantially straight line 60. The beam of light and reflection thereof may, however, be of other shapes without departing from the present concept. The expression "light" as employed herein is intended to encompass all detectable electromagnetic spectra, whether or not visible to the human eye. The focused light source 52 is structured to project a plurality of such beams onto the workpiece 1 and the pallet 2 and is substantially fixed relative to the mast 32.

The focused light source 52 may be a bulb or any other light source (not shown) structured to produce a bright light, and is preferably a laser 53. To create the desired lines 60 when a laser is used, the laser beam may be directed toward a rotating mirror having surfaces that reflect the beam of laser energy. To create the desired lines 60 when a bulb is used, the light from the bulb may be passed through a lens and/or filter (not shown) structured to focus the light into a beam. Alternately, the light may pass through a lens/filter with a shutter having a slit (not shown) to cause a beam to be projected onto the workpiece 1 and the pallet 2. The focused light source 52 is structured to reposition the projected line 60 so as to effectively project a plurality of generally straight lines 60 onto the workpiece 1 and the pallet 2. This may be accomplished by moving the bulb or the lens/filter/shutter or by reflecting the light off the movable mirror.

Figure 4A:
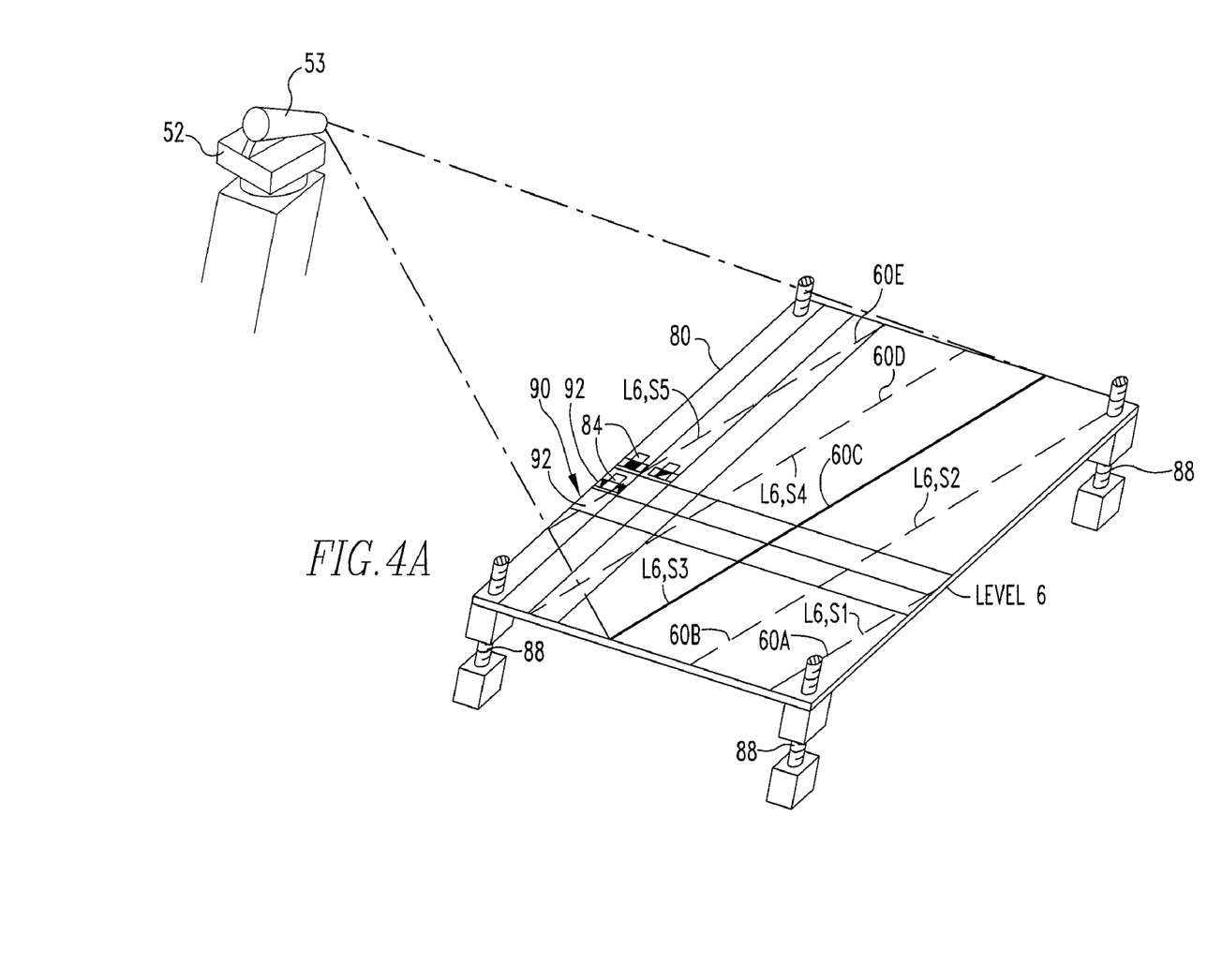
FIG. 4A is a perspective view of a calibration platform at a relatively lower level and depicting a beam reflecting on the calibration platform, such as might be captured as an image by the dimensional detection system camera.
Figure 4B:
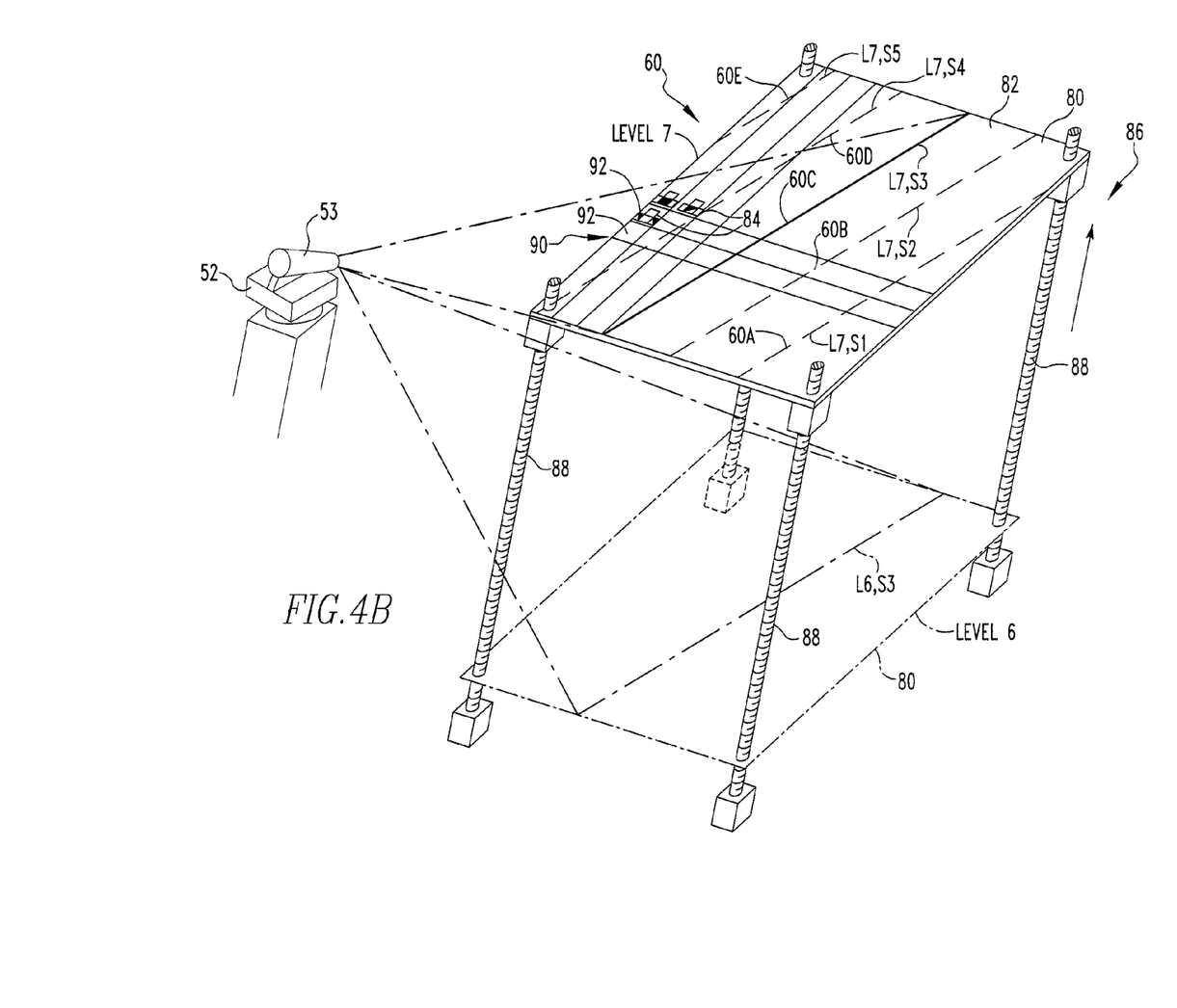
FIG. 4B is a perspective view of the calibration platform of FIG. 4A at a relatively higher level and depicting the beam the same angle as in FIG. 4A reflecting on the calibration platform, such as might be captured as an image by the dimensional detection system camera.

In the preferred embodiment, the laser 53 is structured to project the plurality of generally straight lines 60 sequentially, meaning individually and in series. That is, the laser 53 is structured to project, as shown in FIGS. 4A and 4B, a first line 60A along a first path, then a second line 60B along a second path, then a third line 60C along a third path, etc. The position of each line 60 is determined by the lateral angle at which the laser projects the light. The lateral angle is measured relative to a reference axis which, in the exemplary embodiment depicted herein, is a structure in a fixed position relative to the laser 53, typically the mast 32.

The focused light source 52 is mounted at or near the upper end of the first mast 32A. As there are no structures between the upper end of the first mast 32A and the workpiece 1 and the pallet 2, the focused light source 52 has a substantially clear view of the workpiece 1 while the workpiece 1 is disposed on the forklift assembly 30. From this position, the lines 60 are projected generally downward onto the workpiece 1 and the pallet 2. Further, the projected lines 60 may be projected at a known angle with respect to the longitudinal axis of the forklift truck 10. This angle may be between about zero and ninety degrees and in the described embodiment is about seventy degrees relative to the longitudinal axis of the forklift truck 10 where 0 degrees is parallel to the longitudinal axis of the forklift truck 10. In this configuration the lines 60 are more likely to be projected so as to illuminate a corner of a workpiece 1 that is generally squared relative to the longitudinal axis of the forklift truck 10.

Thus, the laser 53 preferably projects each line 60 at about the same angle with respect to the longitudinal axis of the forklift truck 10. To create the separate lines 60, however, the laser 53 projects each specific line 60A, 60B, 60C, etc. at a different lateral angle with respect to the reference axis which is represented by the first mast 32A.

The camera 54 is a digital camera structured to capture at least one two-dimensional image 5, and preferably a plurality of two-dimensional images, and to electronically communicate those images to the image analysis device 56. Communication of the images 5 to the image analysis device 56 may be wireless or by wire. The camera 54 is in a substantially fixed orientation on the upper end of the second mast 32B and is aimed at the lower portion of the two masts 32, i.e. where a workpiece 1 and the pallet 2 would be located, to enable determinations of the dimensions and the dimensional weight of the workpiece 1. The digital image comprises a plurality of pixels 100 disposed in a two-axis Cartesian grid. As set forth above elsewhere herein, the Cartesian coordinates of the image grid shall be represented by the letters U and V. The units of the grid are pixels 100. Further, as used herein, the origin of the image Cartesian grid shall be located at the upper left corner of the image. That is, the upper leftmost pixel 100 is at U, V coordinates, 0, 0.

The camera 54 is structured to capture an image during each projection of the beam or "sweep" as discussed elsewhere herein. The camera 54 is mounted at or near the upper end of the second mast 32B. As there are no structures between the upper end of the second mast 32B and the workpiece 1 and the pallet 2, the camera 54 has a substantially clear view of the workpiece 1 while the workpiece 1 is disposed on the forklift assembly 30. Thus, each captured image will capture a representation of the line 60 projected on the workpiece 1 and the pallet 2.

The image analysis device 56 is in electronic communication with the camera 54. The image analysis device 56 is structured to receive the at least one digital image from the camera 54 and, preferably, all images in an associated set, i.e. all the images of a workpiece 1 and the pallet 2. The image analysis device 56 is structured to perform an analysis on at least some of the illuminated pixels an image and to characterize the workpiece 1 in one of a number of predetermined fashions, such as by calculating the dimensions of a right hexahedron that would enclose the workpiece 1, which also enables a calculation of the dimensional weight of the workpiece 1.

The image analysis device 56 may further include an output device (not shown), such as, but not limited to, a video screen and/or a printer or another computer system. The image analysis device 56 sends the results of the dimensional analysis or the dimensional weighing calculation or both to the output device.

The image analysis device 56 also includes software, firmware, and the like that are hereinafter referred to as routine(s) 57 (shown schematically). The routine(s) 57 may be structured as a single program but, more typically will be structured as a plurality of cooperative programs; accordingly, all routines shall be identified by reference number 57. The routine(s) 57 may include, but are not limited to, a line thinning routine, a three-dimensional modeling routine, a rotating caliper routine, a convex hull routine, and an LTL volume routine. At least some of these routines are described below in reference to the operations performed.

For example, the line thinning routine 57 is structured to enhance the collected images. More specifically, the line thinning routine 57 is structured to "thin" the recorded lines 60 so that each line 60 has a minimal thickness, preferably a thickness of about one pixel 100. This thinning process improves the accuracy of the analysis of the image and reduces the computational effort that is necessary to perform the analysis.

Accordingly, it is understood that when any action or step is attributed to the image analysis device 56, the image analysis device 56 includes one or more routines 57 structured to perform that action or step. In summary, the image analysis device is structured to identify on an image the two-dimensional coordinates of one or more illuminated pixels within a line and to convert the two-dimensional coordinates of each such illuminated pixel into the three-dimensional coordinates of the corresponding real world point in space that is illuminated by the laser 53, as described below.

The analysis of the images of an illuminated workpiece 1 is accomplished by processing a number of the illuminated pixels of the image with a number of equations having coefficients that are stored in a calibration data set. The calibration data set is derived from a calibration process that is performed prior to the dimensional detection and measurement system being first placed into service, such as when the system is first installed on the forklift truck 10. The calibration process performs a Newtonian Approximation or other data analysis operation on a number of reference images that are created by projecting the generally straight lines 60 from the laser 53 onto a calibration platform 80. The calibration platform 80 has a generally flat and horizontal upper surface 82.

The calibration platform upper surface 82 may include a number of reference patterns 84 which may be computer readable. The reference patterns 84 are at known locations on the upper surface 82. As such, the X, Y coordinates of any particular point on the upper surface 82 of the calibration platform 80 can be determined. The calibration platform 80 (FIG. 3A,) is structured to be moved vertically on a calibration assembly 86 (shown schematically). Accordingly, the particular vertical location of the calibration platform 80 at any given time can be attributed as a Z coordinate to the aforementioned X, Y coordinates of the various points on the upper surface 82 of the calibration platform 80. As such, three-dimensional X, Y, Z coordinates of points on the upper surface 82 of the calibration platform 80, which are real world points in space, can be determined.

The calibration assembly 86 is structured to hold the calibration platform 80 in a substantially horizontal plane. The calibration assembly 86 includes at least three, and preferably four, vertically adjustable support posts 88 that may be positioned at indexed (known) heights. Further, the calibration assembly 86 includes a measuring device, such as, but not limited to a scale (not shown), on the adjustable support posts 88, that provides a measurement indicating the height of the calibration platform 80 above the ground.

Before discussing the calibration procedure in detail, a summary description would be helpful. Generally, the calibration procedure involves recording the positions of projected lines 60 at a given lateral angle at each of a plurality of vertical calibration levels. A system of equations is created having coefficients that represent the way in which pixels at positions on an image (U, V coordinates, as discussed above) are associated with "real world" points in three-dimensional space, i.e. in a three-dimensional X, Y, Z coordinate system. More specifically, the general form of the equations discussed below is known, and the calibration process involves determining the set of coefficients that are associated with the sweeps at a given lateral angle and that are used within the equations. During operation of the dimensional detection system, i.e., subsequent to the calibration operation, the coefficients and resultant equations allow conversion from the U, V coordinates of an illuminated pixel of an image into the corresponding and actual X, Y, Z coordinates of a real world point in space on a surface of a workpiece 1 that is illuminated by the laser 53 and which has been captured as the illuminated pixel of the image.

The equations may be represented as:

$$U = aX + bY + cZ + d$$

$$V = eX + fY + gZ + h$$

Generally, the constants "d" and "h" are zero, or very small, in the present system and may be ignored. The six coefficients a, b, c, e, f, and g are unique to the lateral angle of the beam from the laser 53 and are determined by the calibration process.

Hereinafter, a first reference elevation shall be identified as calibration "level 0", the next highest calibration level shall be identified as "level 1" and each successively higher calibration level shall be identified in sequence, e.g. "level 2," "level 3," etc. In the exemplary FIG. 4A, the calibration platform 80 is disposed at "level 6". In the exemplary FIG. 4B, the calibration platform has been displaced vertically upward to "level 7", it being noted that FIG. 4B further depicts in broken lines the vertical position of the calibration platform 80 at "level 6" as well as the location of the beam at L6,S3 thereon. Since the focused light source 52 and the camera 54 are at the top of the components that form the forklift assembly 30, the focused light source 52 and the camera 54 are always disposed vertically higher than the various calibration levels. The calibration levels may be generally evenly spaced, although it may also be desirable to group the calibration levels in various regions of interest, such as in a region just off the ground or elsewhere. While there is no specific number of calibration levels required, preferably, there are between about four and ten calibration levels.

The calibration platform upper surface 82 is substantially flat and rectangular and includes a plurality of reference patterns 84. Preferably, the reference patterns 84 include a large scale pattern 90 and plurality of small scale patterns 92. For example, the exemplary calibration platform upper surface 82 is marked in a square grid pattern wherein each square is six inches long and wide, although other sizes, shapes, and arrangements of pattern elements can be employed without departing from the present concept. This grid is the large scale pattern 90. Within each square of the large scale pattern 90 are smaller square grids, each of which is a small scale pattern 92. Each small scale pattern 92 includes a set of white (or otherwise reflective) squares and black (or otherwise non-reflective) squares, or combined black and white squares. Each small scale pattern 92 has a different layout for the white/black squares. Thus, each square in the large scale pattern 90 is unique. As such, the location of each square in the large scale pattern 90 is identifiable. That is, projecting a light beam across the large scale patterns 90 and the small scale patterns 92 and analyzing the reflected light may be used to identify each square in the large scale pattern 90. Further, the image analysis device 56 includes an electronic model of the large scale patterns 90 and the small scale patterns 92, which is a representation of the calibration platform 80 in the form of a routine 57 having a database specifying the location of each square in the large scale pattern 90 and the arrangement of black and white squares of each such small scale pattern 92 on the calibration platform upper surface 82.

Thus, when a line 60 is projected on the upper surface 82 of the calibration platform 80, the line reflects off the white squares (or the white portions of the partially white squares) of the small scale patterns 92 and does not reflect off the black squares (or the black portion of the partially black squares) of the small scale patterns 92. The image analysis device 56 includes a routine 57 structured to analyze the lines 60 and to identify each square in the large scale pattern 90.

Figure 5:
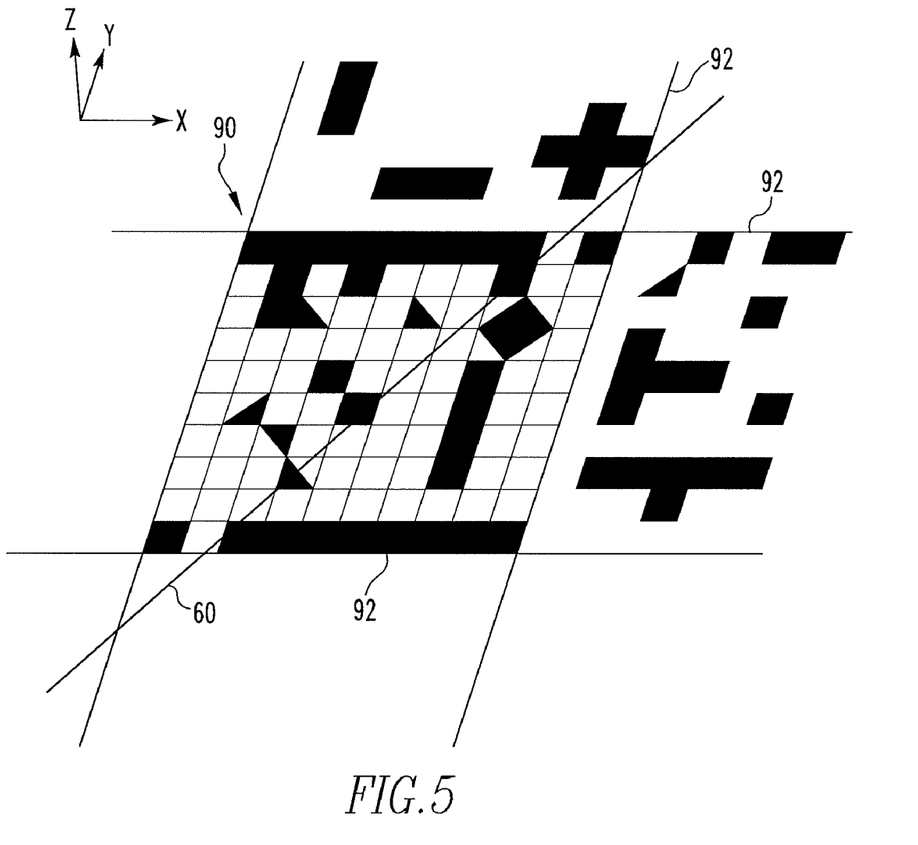
FIG. 5 is a detailed view of a portion of the calibration platform with reference patterns.

As shown in FIG. 5, the line 60 extends over the upper surface 82 of the calibration platform 80 as well as multiple reference patterns 84. The analysis device routine 57 captures an image 5 of the line 60, and after any additional processing steps such as, but not limited to, line thinning have occurred, the U, V coordinates of the pixels that have been illuminated by the line 60 may be established. More particularly, since the upper surface 82 of the calibration platform 80 includes both reflective and non-reflective regions, the reflection of the line 60 is recorded in the image as an aligned series of dashes separated by spaces, with the dashes themselves being representative of a reflection of the beam from a reflective region of the upper surface 82, and with the spaces being representative of the non-reflection of the beam 60 from a non-reflective region of the upper surface 82. The location of the pixel 100 where the line 60 enters a white portion of reference pattern 84 and the location of the pixel 100 where the line 60 exits the white portion of the reference pattern 84 are determined for each of a plurality of the dashes. Based upon the model of the reference patterns 84, the arrangement of illuminated pixels of the image can be used to determine the precise location of the line 60 on the upper surface 82 of the calibration platform 80. Finally, the vertical position, i.e. the "Z" coordinate is known as the calibration platform 80 is at a known height, as discussed below.

Thus, for a particular point, the values U, V, X, Y, and Z in the equation set forth above can be determined. That is, the U, V values are the coordinates of a pixel of an image, and the X, Y, Z values are the coordinates of a corresponding point on the upper surface 82 of the calibration platform 80 that was illuminated by the beam and that is represented by the illuminated pixel of the image. Since "d" and "h" are typically zero and are assumed as such, the equations may be represented as:

$$U = aX + bY + cZ$$

$$V = eX + fY + gZ$$

Thus, there are two equations each having three variables (which together are the unknown six coefficients a, b, c, e, f, and g.). Such equations may be "solved," meaning that a rational solution may be found for the coefficients, using well known and readily available programs/routines such as, but not limited to, OpenCV found at http://sourceforge.net/projects/opencv/ which may or may not employ Newtonian Approximation. That is, given six variables in two equations, there may be many solutions, but typically only one solution is valid, and it can be identified using known public programs such as OpenCV.

Accordingly, calibration of the image analysis device 56 is accomplished as follows. The calibration assembly 86 positions the calibration platform 80 at a first vertical position that is established as a reference elevation, i.e. level 0. The level 0 vertical position likely will be close to the ground. As noted above, this height is known as established by a measurement device on the calibration assembly 86. The focused light source 52 sequentially projects a plurality of spaced generally straight lines 60 onto the calibration platform 80. Each projection of a line 60 is hereinafter identified as a "sweep", and an image is recorded of each such sweep. As noted above, the spacing/positioning of the lines 60 is accomplished by changing the lateral angle of the projected line. For purposes of illustration, each sweep may be identified herein by a number, e.g. "sweep 1," followed by a "sweep 2," etc. Each sweep creates a line 60. Preferably, the focused light source 52 performs between about ten and two hundred sweeps at each level, individually projecting a line 60 onto the calibration platform upper surface 82 for each sweep. For the sake of clarity, however, the figures and the following discussion shall be limited to five sweeps. Further, as discussed herein, the sweeps shall be identified as sequentially moving from the right to the left. Thus, sweep 1 is to the far right, sweep 2 is located to the left of sweep 1, sweep 3 is centrally located, sweep 4 is located to the left of sweep 3, and sweep 5 is on the far left.

Accordingly, for this example, there are five sweeps at each calibration level. The sweeps may hereinafter be identified by a designation representing the calibration level and the sweep number. The designation is in the format L#/S# wherein the number following the "L" is the level and the number following the "S" is the sweep number. Thus, for example, line L1/S3 indicates central sweep at calibration level 1 and line L5/S1 indicates the far right sweep at calibration level 5.

The camera 54 captures a separate image of each sweep, i.e. the camera 54 captures an image of the calibration platform 80 including each generally straight line 60 at each calibration level. As shown, the focused light source 52 is disposed to the left side of the longitudinal centerline of the forklift truck 10, and the lines 60 of each sweep appear, from the perspective of the camera 54, to be farther to the left at each successively higher level. That is, from a two-dimensional perspective, as captured in the images, sweep 3 on level 7 will appear to be to the left of sweep 3 on level 6, as can be understood from FIG. 4B. It is noted that when the calibration platform 80 is positioned very high or very low, one or more sweeps may not project a line 60 on the calibration platform 80 at all; these lines 60 are ignored for that calibration level.

A composite depiction of the calibration platform 80 having all five sweeps, i.e. each generally a straight line 60, is shown in FIG. 4A, it being reiterated that only one line 60 exists on the calibration platform 80 at any given time, and that a separate image is recorded of each line 60. The images are each subjected to a line thinning routine 57 which reduces each elongated region of illuminated pixels in the image, i.e., the representation of a portion of a line 60 on the calibration platform 80, to a width of about one pixel 100. As noted above, each reference pattern 84 is slightly different and each reference pattern 84 is at a specific position on the calibration platform 80. Since each line of illuminated pixels will include a number of dashes separated by spaces (non-illuminated pixels due to the line 60 extending across black or otherwise non-reflective points on the upper surface 82 of the calibration platform 80), the model of the reference pattern 84 can be employed to identify the specific location of the line 60 on the upper surface 82. As such, particular illuminated pixels of the image can be associated with specific points on the upper surface 82 of the calibration platform 80.

The location of the calibration platform 80 reference patterns 84 may themselves also be recorded. That is, data representative of the reference patterns 84 may also be detected and used in determining the six coefficients a, b, c, e, f, and g. More particularly, the vertex of each pair of adjacent corners of each pair of adjacent squares of the large scale pattern 90 may be detected with further processing of the pixel illumination data in the image. This can provide further data regarding specific pixels of the image (having U, V coordinates) that correspond with points having known locations on the upper surface 82 of the calibration platform 80 (having X, Y, Z coordinates).

The focused light source 52 sequentially projects a plurality of generally straight lines 60 onto the calibration platform 80. Each time a line 60 is projected, the camera 54 captures an image 5. The images 5 are transmitted to the image analysis device 56.

Once the data for the initial calibration level is captured, the calibration platform 80 is moved upward to the next calibration level. The procedure is then repeated for each additional calibration height. The height of the calibration platform 80 at each calibration height is recorded and associated with each image for each sweep at that height. It is noted that the movement of the calibration platform 80 between calibration levels can be upward or downward without limitation, it being necessary simply to record the height of the upper surface 82 of the calibration platform 80 at each such calibration level.

The illuminated pixel coordinates (U, V) and the corresponding known points on the upper surface 82 of the calibration platform 80 (having X, Y, Z coordinates) for all of the images of the beam at a particular angle and at all of the various heights of the calibration platform 80 are then processed together using Newtonian approximation or other data processing methodology to determine the six coefficients a, b, c, e, f, and g that are associated with that particular angle of the beam. That is, a data set is generated for each image, with the data set comprising a number of sets of pixel coordinates (U, V) and, for each set of pixel coordinates, the corresponding set of real world coordinates (X, Y, Z). Again, such data is derived from a comparison of the illuminated pixels of an image captured of a line 60 (on the calibration platform 80 at a specific angle of the beam and at a specific height of the calibration platform 80) with an electronic model of the locations of reference images 84 (on the upper surface 82 of the calibration platform 80) to determine for each such illuminated pixel the corresponding real world location on the upper surface 82 of the calibration platform 80 at a given calibration height. The data sets for all of the images of the beam at the particular angle at all of the various heights of the calibration platform 80 are then subjected to Newtonian Approximation using the two aforementioned equations to determine the six coefficients that a, b, c, e, f, and g that are associated with that particular angle of the beam.

Thus, as a result of such calibration, the image analysis device 56 has created a set of coefficients along with other data that are associated with a particular angle of the beam from the laser 53 which, when used with the two equations set forth above, enable the conversion of the illuminated pixels 100 of an image (i.e., illuminated by the laser 53 illuminating a point on a surface of a workpiece 1 at the same angle), as identified by (U, V) coordinates, into the real world (X, Y, Z) coordinates for that point. The calibration data set will typically include a separate set of the six coefficients a, b, c, e, f, and g for each of a plurality of angles of the beam 60 from the laser 53.

During operation of the dimensional detection system, i.e., after the calibration operation has been completed and the calibration data set has been created, the dimensional detection system is usable to characterize a workpiece 1. The workpiece is placed on the pallet 2, for example. The laser 53 sequentially directs a plurality of analysis beams 60 at the predetermined angles onto the workpiece 1, and the camera 54 captures an image of each such sweep, i.e., each such reflection of the analysis beam 60 at a particular predetermined lateral angle on the workpiece 1.

Figure 6:
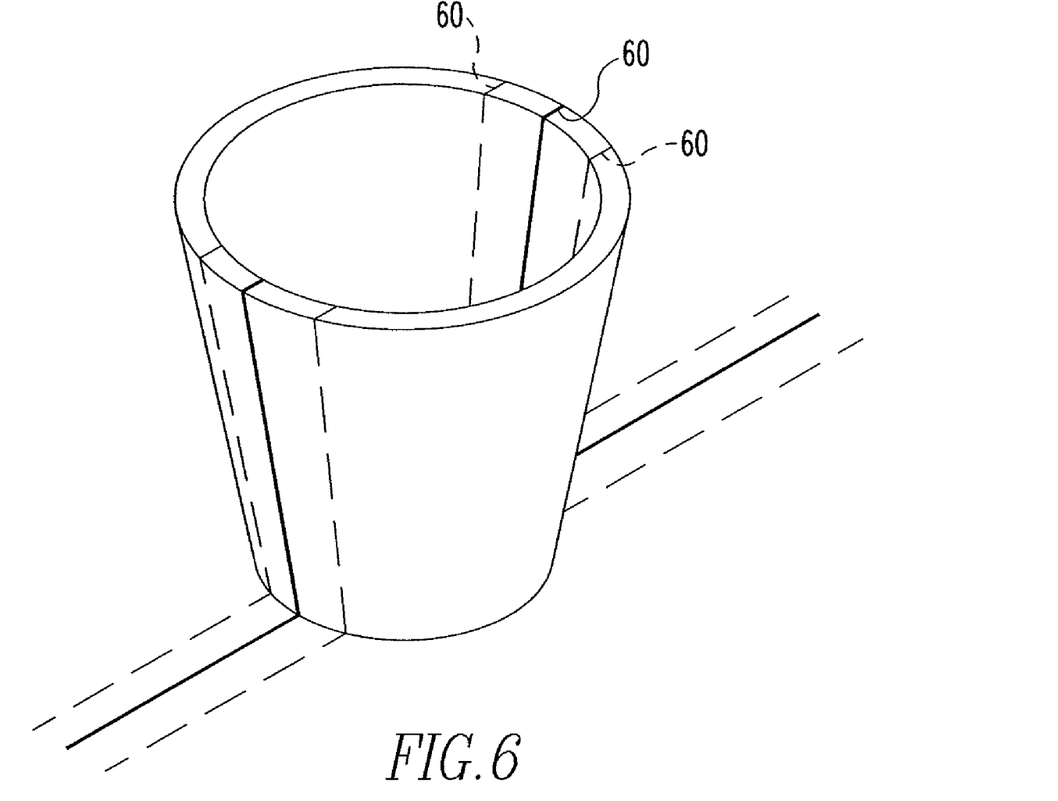
FIG. 6 is a perspective view of a workpiece being measured.

An example of such an analysis beam 60 projected at a particular predetermined angle onto a workpiece 1 is depicted generally in FIG. 6 along with a number of additional schematically-depicted beams 60 (in broken lines) projected at other predetermined angles onto the workpiece 1. In this regard, it is reiterated that only a single beam is projected onto a workpiece 1 at any given time, and an image is recorded of only a single analysis beam 60 at a predetermined angle. Thus, a separate image will be recorded of each individual analysis beam 60.

The image of the analysis sweep is transmitted to the image analysis device 56 and the image is processed using the six coefficients a, b, c, e, f, and g from the calibration data set that are associated with that particular predetermined angle. That is, the image is processed by using the six coefficients plugged into the two aforementioned equations.

First, every pixel 100 of an image is processed against a configured threshold to determine if the illumination level of the pixel 100 is bright enough to be considered to be an illuminated, or, "object" pixel 74. If so, the U, V coordinates of the object pixel 74 are stored in memory. Next, the line thinning algorithm removes excess object pixels 74 from the memory containing the list of object pixels 74. The U, V coordinates of each remaining object pixel 74 are then entered into the two aforementioned mathematical equations using the six coefficients from the calibration data set that are associated with the angle of the beam from the laser 53 at which the image was recorded.

These equations convert the two-dimensional coordinates of each object pixel 74, i.e. the U, V coordinates, into a corresponding three-dimensional, i.e. X, Y, Z, real world coordinate, which is a point on a surface of the workpiece 1 that was illuminated by the beam from the laser 53 at the particular predetermined angle when the image was recorded. These coordinates may be filtered and any points with a height of 0 (a Z coordinate value) may be filtered out as corresponding with the pallet 2. All remaining sets of X, Y, Z coordinates that were identified as corresponding with an object pixel 74 are then stored.

The operation is repeated for each image taken of each analysis beam at a different predetermined angle. All of the real world X, Y, Z coordinates, which represent points on a surface of the workpiece 1, are stored in a memory construct.

The image analysis device 56 can then use the stored X, Y, Z coordinates in any of a variety of manners. By way of example, the X, Y, Z coordinates may be processed using a convex hull routine 57. Such a convex hull routine 57 determines the smallest polygon that can encompass a set of points that lie in a plane. A rotating caliper routine 57 is a particular type of convex hull algorithm and generates the smallest rectangle that can encompass the same points.

The operation begins by ignoring the Z coordinates of the sets of X, Y, Z coordinates for the workpiece, and effectively inputting the X, Y coordinates into the rotating caliper routine 57. The rotating caliper routine 57 will then return a length and a width of a rectangle having square corners that will encompass all of the X, Y points. The maximum Z value of all of the points can then be attributed as a height dimension to the aforementioned rectangle to result in a right hexahedron having length, width, and height dimensions which can serve as the characterization of the workpiece 1. All of the real world X, Y, Z points in space would lie within the aforementioned right hexahedron, although it is noted that this is not intended to suggest that a carton would necessarily be constructed for the purpose of enclosing the workpiece 1 itself. Rather, the dimensions of the right hexahedron can be employed to determine a volume which can then be used with a standard unit as mentioned elsewhere herein to calculate a dimensional weight of the workpiece 1.

Alternatively, it may be desirable to characterize the workpiece 1 in its orientation on a pallet 2, such as if a customer in an LTL shipping transaction affixes a workpiece 1 to a pallet 2 in a specific orientation on the pallet 2. In such a scenario, it might be desirable to characterize the workpiece with respect to dimensions lying along axes that are parallel with the sides of the pallet and that have a height perpendicular to an upper surface of the pallet 2. In so doing, the minimum X value of any real world point in space might be subtracted from the maximum X value of any of the real world points in space to determine a maximum width of the workpiece. Similarly, the minimum Y value of any of the points in space might be subtracted from the maximum Y value of any of the points in space to determine a value for the length of the workpiece such as would lie along the longitudinal axis of the forklift truck 10. The maximum Z value of any of the points could then be attributed as a height, with the width, length, and height values then being used to determine a volume for characterizing the workpiece 1 and for use in determining a dimensional weight of the workpiece 1.

It is noted that for each set of U, V coordinates of an image, the two aforementioned equations generate a pair of X values, a pair of Y values, and a pair of Z values that are intended to correspond with a single real world point in space. It is further noted, however, that one X value in the pair of X values will be clearly wrong, as will one of the pair of Y values and one of the pair of Z values. For instance, the incorrect value might be extremely large or extremely small, or it might have negative value when it should not. An example of an extremely large value might be, for instance, a value that places the real world point outside the building where the analysis is being performed. Depending upon the coordinates employed, any of a number of simple algorithms or bounds or both can be developed and employed to determine which of the two X values, which of the two Y values, and which of the two Z values is incorrect, impossible, irrational, etc. The remaining X, Y, and Z values are the coordinates of the real world point in space that actually corresponds with the U, V coordinates of the illuminated pixel.

It is also noted that the dimensional detection system 50 may employ more than one light source 52 or more than one image collection device 54 or both depending upon the needs of the application. For instance, the dimensional detection system 50 might include a plurality of lasers 53, with a laser 53 potentially being disposed on each mast 32, and with each laser 53 being generally directed toward separate regions of the pallet 2. In such a scenario, an image might include a series of illuminated pixels at one side thereof from one of the lasers 53 and another series of illuminated pixels at another side thereof from the other of the lasers 53. Such an image may be logically separated into two sets of illuminated pixels by the image analysis device 56 by processing the illuminated pixels at one the end of the image with equations employing a set of coefficients that are associated with the particular angle of the beam from the one of the lasers 53 and by processing the illuminated pixels at the other end of the image with equations employing another set of coefficients that are associated with the particular angle of the beam from the other of the lasers 53. Such a configuration of the dimensional detection system 50 would undergo a separate calibration operation for each such laser 53. Such a configuration might also employ separate image analysis devices 56 to process the different sets of illuminated pixels.

An additional configuration might further include separate image collection devices 54 that are likewise directed at such separate regions of the pallet 2, whereby each such image collection device 54 would be configured to detect the beam 60 from only a single one of the lasers 53. In such an additional configuration, the illuminated pixels of an image from any individual image collection device 54 would result only from a single beam and thus would be processed with equations that employ the coefficients that are associated with that beam at a particular angle.

Moreover, the dimensional detection system 50 may employ a plurality of light sources 52 having output at different wavelengths that can be distinguished by an image collection device 54. For example, one laser 53 might output light at a first wavelength to create a first beam 60 on a workpiece 1, and another laser 53 might output light at a second, different wavelength to simultaneously create a second beam 60 on the workpiece 1. In such a configuration, the image collection device 54 may be configured to determine which illuminated pixels resulted from each of the beams 60. The image collection device 54 therefore would process the illuminated pixels that resulted from one of the beams with one set of associated coefficients and process the illuminated pixels that resulted from the other of the beams with another set of associated coefficients.

Any of a variety of different configurations are possible. Such different configurations can have an advantage of more rapid processing by performing certain operations more-or-less simultaneously.

Figure 7:
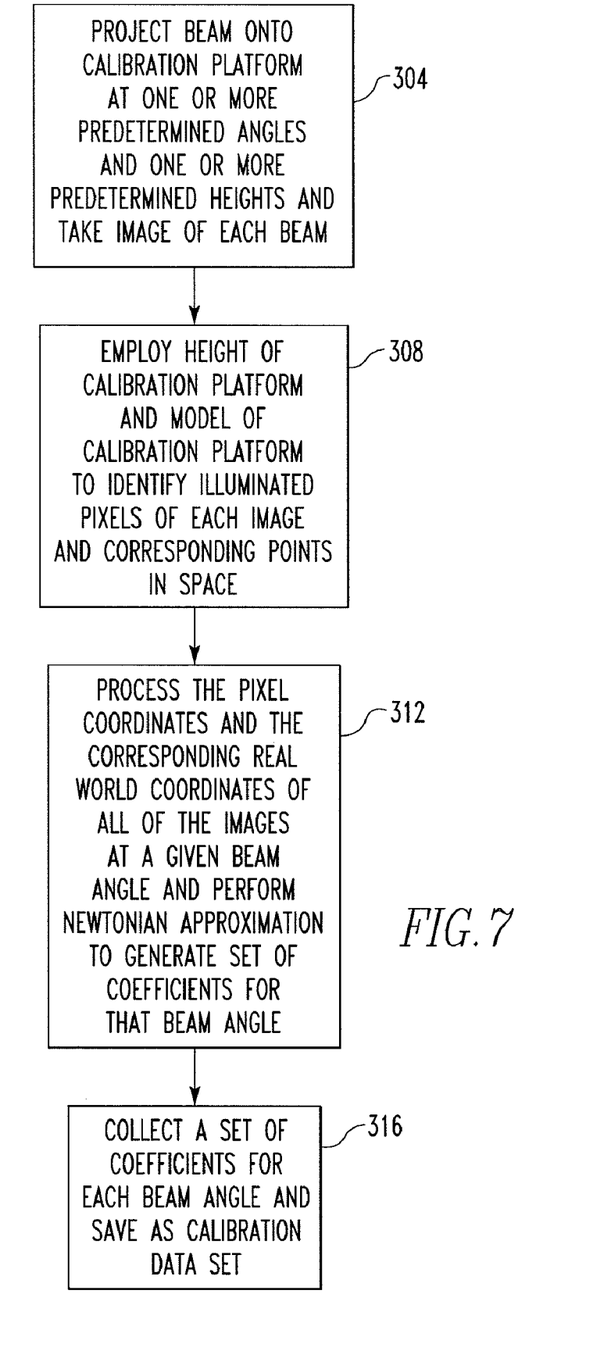
FIG. 7 is a flowchart of a method of performing a calibration operation.

A flowchart generally summarizing the calibration process is depicted generally in FIG. 7. Processing begins, as at 304, where a beam is projected onto the calibration platform 80 at one or more predetermined angles with respect to the mast 32 and at one or more predetermined heights of the calibration platform 80, with an image being taken of each such beam. For each such image, the electronic model of the upper surface 82 of the calibration platform 80 and the actual height of the calibration platform 80 are employed to identify real world points in space disposed on the upper surface 82 of the calibration platform 80 that correspond with illuminated pixels of the image, as at 308. Processing thereafter continues, as at 312, where the pixel coordinates (U,V) and the corresponding real world coordinates (X,Y,Z) for all of the images taken of the beam at a given angle are subjected to Newtonian Approximation or other data processing operations to generate the set of six coefficients that are associated with the beam angle. As set forth elsewhere herein, a separate set of coefficients is generated for each such predetermined angle of the beam based upon the images that were recorded at the angle and a separate Newtonian Approximation operation. Processing thereafter concludes, as at 316, where a calibration data set is formed out of the various sets of coefficients that are associated with the various predetermined angles of the beam.

Once the calibration data set has been developed for the dimensional detection system 50, the dimensional detection 50 can be placed into service without the need for further recalibration. It is noted, however, that after repair, maintenance, and the like of the forklift truck 10, or otherwise periodically, recalibration may be desirable depending upon the needs of the application.

Figure 8:
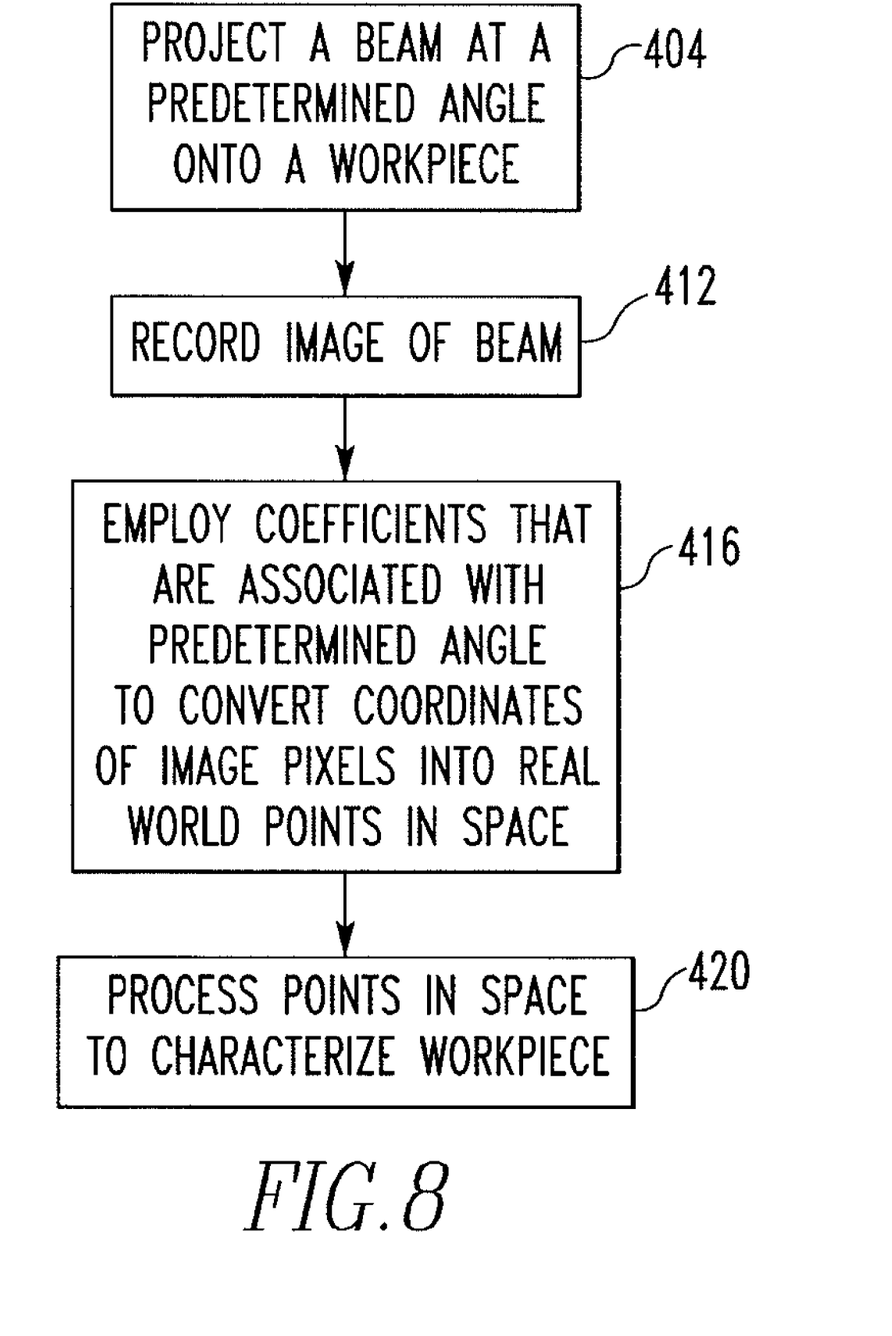
FIG. 8 is a flowchart of a method of performing a dimensional analysis.

An exemplary flowchart depicting certain aspects of the analysis of a workpiece 1 is depicted generally in FIG. 8. Processing begins, as at 404, where a beam 60 is projected at a predetermined angle onto a workpiece 1. An image is then recorded, as at 412, of the beam 60. The image analysis device 56 then employs the coefficients from the calibration data set that are associated with the predetermined angle of the beam to convert the U, V coordinates of illuminated image pixels into real world corresponding X, Y, Z coordinates on the surface of the workpiece 1, as at 416. Processing then proceeds, as at 420, where the X, Y, Z points in space are processed in order to characterize the workpiece 1. As mentioned elsewhere herein, a characterization of the workpiece is the right hexahedron that would enclose all of the real world points in space of the point cloud and that can be used to calculate a volume from which a dimensional weight can be determined.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method of generating a calibration data set for a measurement apparatus that comprises a focused light source that is structured to project a beam onto a workpiece, an image collection device that is structured to detect a reflection of the beam on the workpiece and to generate a number of images, and an image analysis device that has access to the calibration data set, the image collection device and the image analysis device being in electronic communication, the method comprising:

projecting a beam oriented at a predetermined angle oblique to a reference axis onto a calibration platform that comprises a plurality of indices and that is disposed at each of a plurality of positions along the reference axis;

capturing at each position of at least some of the plurality of positions an image that comprises a number of illuminated pixels representative of at least a portion of the beam on at least some of the indices of the calibration platform at the position;

for each image, employing the position of the calibration platform along the reference axis and a representation of the calibration platform to generate for each of at least some of the illuminated pixels a point in space that is representative of a point on a surface of the calibration platform at the position along the reference axis that is illuminated by the beam; and generating a calibration data set from at least some of the points in space.

2. The method of claim 1, further comprising generating as the calibration data set a data set that comprises a number of coefficients that correspond with the predetermined angle and that are usable in a number of equations to enable an illuminated pixel of an image of a workpiece that is illuminated by an analysis beam at the predetermined angle to be transformed into a point in space that corresponds with a point on a surface of the workpiece that is illuminated by the analysis beam.

3. The method of claim 2, further comprising:

projecting onto the calibration platform another beam oriented at another predetermined angle oblique to the reference axis;

capturing at each of a plurality of positions of the calibration platform along the reference axis another image that comprises a number of illuminated pixels representative of at least a portion of the another beam on the calibration platform; and for each such another image, employing the position of the calibration platform along the reference axis and the representation of the calibration platform to generate for each of at least some of the illuminated pixels another point in space that is representative of a point on the surface of the calibration platform at the position along the reference axis that is illuminated by the beam; and employing the another points in space to generate as a part of the calibration data set another data set that comprises another number of coefficients that correspond with the another predetermined angle and that are usable in the number of equations to enable an illuminated pixel of an image of the workpiece that is illuminated by another analysis beam at the another predetermined angle to be transformed into a point in space that corresponds with a point on the surface of the workpiece that is illuminated by the another analysis beam.

* * * * *